(12) United States Patent
Goossen

(10) Patent No.: US 8,406,601 B2
(45) Date of Patent: Mar. 26, 2013

(54) METHOD AND SYSTEM FOR REPRODUCING AUDIO/VIDEO CONTENT AND PORTABLE DEVICE

(75) Inventor: Jack Alexander Goossen, Eindhoven (NL)

(73) Assignee: NXP B.V., Eindhoven (NL)

( * ) Notice: Subject to any disclaimer, the term of this patent is extended or adjusted under 35 U.S.C. 154(b) by 353 days.

(21) Appl. No.: 12/810,289

(22) PCT Filed: Oct. 30, 2008

(86) PCT No.: PCT/IB2008/054520

§ 371 (c)(1),
(2), (4) Date: Jun. 23, 2010

(87) PCT Pub. No.: WO2009/083813

PCT Pub. Date: Jul. 9, 2009

(65) Prior Publication Data

US 2010/0278510 A1 Nov. 4, 2010

(30) Foreign Application Priority Data

Dec. 28, 2007 (EP) .................................... 07124157

(51) Int. Cl.
*G09B 5/125* (2006.01)
*G09B 29/008* (2006.01)
(52) U.S. Cl. ........................................ 386/230; 715/700
(58) Field of Classification Search ........................ None
See application file for complete search history.

(56) References Cited

U.S. PATENT DOCUMENTS

| 5,796,351 A | 8/1998 | Yabuki |
| 5,894,119 A | 4/1999 | Tognazzini |

(Continued)

FOREIGN PATENT DOCUMENTS

| WO | 94/27206 A1 | 11/1994 |
| WO | 98/06099 A1 | 2/1998 |

(Continued)

OTHER PUBLICATIONS

International Search Report for Int'l. Patent Appln. No. PCT/IB2008/054520, published as WO 2009/083813A3.

(Continued)

*Primary Examiner* — Gims S Philippe
*Assistant Examiner* — Reza Aghevli

(57) ABSTRACT

A method for reproducing audio and/or video content on a device is provided. A position of a user is determined. Audio and/or video content to be reproduced on the device is selected based on the position of the user and is reproduced on the device. If the determined position of the user is in a first region (1), at least one first audio and/or video 5 content is selected. If the determined position of the user is in a second area (2), at least one second audio and/or video content is selected. If the determined position of the user is in an overlap region of the first and second area or in a region between the first and second area, a third audio and/or video content is generated based on at least the first and/or second audio and/or video content and the third audio and/or video content is selected to be reproduced.

9 Claims, 2 Drawing Sheets

U.S. PATENT DOCUMENTS

| | | | |
|---|---|---|---|
| 5,929,848 A | 7/1999 | Albukerk et al. | |
| 6,944,447 B2 | 9/2005 | Portman et al. | |
| 7,044,372 B2* | 5/2006 | Okuda et al. | 235/384 |
| 7,062,778 B1* | 6/2006 | Pattersson | 725/46 |
| 7,917,153 B2* | 3/2011 | Orwant et al. | 455/456.1 |
| 2004/0203944 A1* | 10/2004 | Huomo et al. | 455/466 |
| 2005/0051623 A1 | 3/2005 | Okuda et al. | |
| 2005/0113115 A1* | 5/2005 | Haberman et al. | 455/456.3 |
| 2006/0154674 A1* | 7/2006 | Landschaft et al. | 455/456.6 |
| 2007/0015521 A1* | 1/2007 | Casey | 455/456.3 |
| 2007/0173266 A1* | 7/2007 | Barnes, Jr. | 455/456.1 |
| 2009/0011772 A1* | 1/2009 | Choi et al. | 455/456.1 |
| 2009/0044235 A1* | 2/2009 | Davidson | 725/87 |
| 2009/0061764 A1* | 3/2009 | Lockhart et al. | 455/3.06 |
| 2009/0158344 A1* | 6/2009 | Anglin, Jr. | 725/46 |

FOREIGN PATENT DOCUMENTS

| | | |
|---|---|---|
| WO | 01/33872 A1 | 5/2001 |
| WO | 03/049315 A1 | 6/2003 |

OTHER PUBLICATIONS

Lopez de Ipina, D. et al. "LocALE: a Location-Aware Lifecycle Environment for Ubiquitous Computing", Proc. 15th Int'l. Conf. on Information Networking, pp. 419-426 (2001).

* cited by examiner x : play stream x x/y : cross-fade between stream x and y

METHOD AND SYSTEM FOR REPRODUCING AUDIO/VIDEO CONTENT AND PORTABLE DEVICE

FIELD OF THE INVENTION

The present invention relates to a method and system for reproducing audio and/or video content and a portable device

BACKGROUND OF THE INVENTION

With the availability of novel devices like portable or mobile devices, it is desirable to be able to reproduce audio/video content on the devices at a plurality of locations, wherein the audio/video content may be previously stored in the device or may be received on-the-fly.

WO 03/049315 A1 shows a method for wirelessly triggering a portable device.

The portable device comprises a memory with previously stored audio/video data to be reproduced based on the wireless triggering according to the location of the user. However, such a method does not provide for a flexible location sensitive reproduction method.

U.S. Pat. No. 5,929,848 concerns a system for providing information on objects of an exhibition. A signal identifying an object is transmitted. A personal interpretive device receives the signal and retrieves information like audio/video data stored in its memory.

SUMMARY OF THE INVENTION

It is therefore an object of the invention to provide a method and a system for reproducing audio and/or video content.

This object is solved by a method according to claim 1, a system according to claim 8 and a portable device according to claim 9.

Therefore, a method for reproducing audio and/or video content on a device is provided. A position of a user is determined. Audio and/or video content to be reproduced on the device is selected based on the position of the user and is reproduced on the device. If the determined position of the user is in a first region, at least one first audio and/or video content is selected. If the determined position of the user is in a second area, at least one second audio and/or video content is selected. If the determined position of the user is in an overlap region of the first and second area or in a region between the first and second area, a third audio and/or video content is generated based on at least the first and second audio and/or video content and the third audio and/or video content is selected to be reproduced.

According to an aspect of the invention, the audio and/or video content is transmitted to the device and the transmitted audio and/or video content is received and reproduced on the device.

According to a preferred aspect of the invention, the device is a portable or mobile device.

According to a further aspect of the invention, the device is associated to the user such that the position of the device will correspond to the position of the user.

According to a further aspect of the invention, the first region is within a first distance to a destination, and the second region is within a second distance to the destination. If the determined position of the user is within in an overlapping region between the first and second distance to the destination, the third audio and/or video content is selected to be reproduced.

According to a further aspect of the invention, the selected third audio/video content is streamed to the device.

According to a further aspect of the invention, the position of the user is determined by the portable device. The determined position is forwarded to a selecting device. The audio/video content to be reproduced is selected based on the determined position the selecting device. The selected audio and/or video content is streamed to the portable device.

The invention also relates to a system for reproducing audio/video content, which comprises a selecting unit for selecting audio and/or video content based on a position of a user. The selecting unit is adapted to select at least one first audio and/or video content, if the determined position of the user is in a first region. The selecting unit is adapted to select at least one second audio and/or video content, if the determined position of the user is in a second area. If the determined position of the user is in an overlap region of the first and second area or in a region between the first and second area, the selecting unit is adapted to generate a third audio and/or video content based on at least the first and second audio and/or video content and the selecting unit is adapted to select the third audio and/or video content to be reproduced. The system also comprises a reproduction unit for reproducing the selected first, second or third audio and/or video content.

The invention furthermore relates to a portable device, which comprises a selecting unit for selecting audio and/or video content based on a position of a user. The selecting unit is adapted to select at least one first audio and/or video content, if the determined position of the user is in a first region. The selecting unit is adapted to select at least one second audio and/or video content, if the determined position of the user is in a second area. If the determined position of the user is in an overlap region of the first and second area or in a region between the first and second area, the selecting unit is adapted to generate a third audio and/or video content based on at least the first and second audio and/or video content and the selecting unit is adapted to select the third audio and/or video content to be reproduced. The device also comprises a reproduction unit for reproducing the selected first, second or third audio and/or video content.

The invention relates to the idea to reproduce audio/video content based on a position of the user. Accordingly, by moving the user can change e.g. the music he is listening to. The audio/video content can be stored in the (portable) device or it can be transmitted (e.g. streaming) to the device after the selection process. The position of the user may correspond to the position of the portable device if the user is carrying or wearing the device. The device may determine its position or the position of the device may be determined by other means. The position information may be processed and the selection process may be performed in the portable device. Alternatively, the position information may be processed and the selection process may be performed in another device (like a server), wherein the selected audio/video content may be transmitted or streamed to the portable device. In a first region or for first distance to a destination a first audio/video content is selected to be reproduced and in a second region or for second distance to a destination a second audio/video content is selected to be reproduced. In an overlap region or between the first and second region a third audio/video content is generated based on at least the first and second audio/video content and the third audio/video content is selected to be reproduced. Accordingly, by moving the user can change e.g. the music he is listening to.

Further aspects of the invention will be defined in the dependent claims.

BRIEF DESCRIPTION OF THE DRAWINGS

The advantages and embodiments of the present invention will now be described in more detail with reference to the Figures.

DETAILED DESCRIPTION OF EMBODIMENTS

Figure 1:
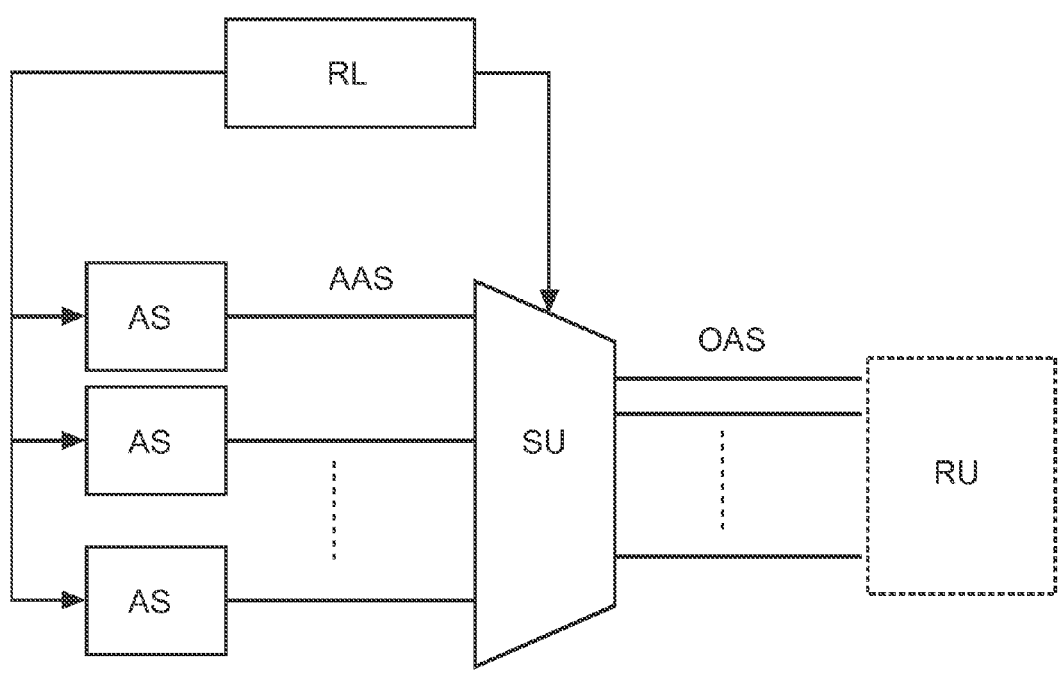
FIG. 1 shows an illustration of a first embodiment according to the invention.

FIG. 1 shows an illustration of a first embodiment of the invention. Several audio sources AS may be provided which are each generating an audio stream as adjacent audio streams AAS. All audio streams can be forwarded to the selector unit SU. The selector unit also receives the position or location RL of a user or a portable or mobile device and therefore the position of the listener or viewer. Based on the audio streams received by the audio sources and the position or location of the mobile device or portable device RU, the selector unit SU outputs output audio streams OAS. Based on the location or position of the portable or mobile device, the selector unit SU may select any one of the audio streams. In addition, the selector unit may also generate a further audio stream based on the adjacent audio streams, e.g. the selector unit can mix two or more of the audio streams and output audio streams OAS.

The location or position of the user or portable or mobile device may be determined by the portable or mobile device itself or it may alternatively be determined by any other means.

The output audio streams OAS may be forwarded to a transmitter which is able to transmit the audio streams to the respective portable or mobile device. The transmission may be performed wirelessly and in a streaming fashion. When the portable or mobile device receives the transmitted audio stream OAS, it may reproduce the content and may output an audio signal.

It should be noted that according to the first embodiment an audio stream and/or a video stream may be transmitted to the portable device.

Although in the first embodiment it has been described that the multi-media content is transmitted to a portable or mobile device, the multi-media content may also already be present in the device or it may be stored in the device before the selection process is performed. In addition or alternatively, the selection process may also be performed by the device itself. Therefore, the selector unit SU may also be part of the device.

Moreover, although in the first embodiment it has been described that the device is portable or mobile, the principles of the invention with respect to the selection process may also apply to a device which is fixed and not mobile. The fixed device may receive the location of the user via an external device, which can for example be a portable device or which may also include other means such as video camera analysis, etc.

The selection process may be performed by an external device like a server. The output stream will then be transmitted to the portable device.

Figure 2:
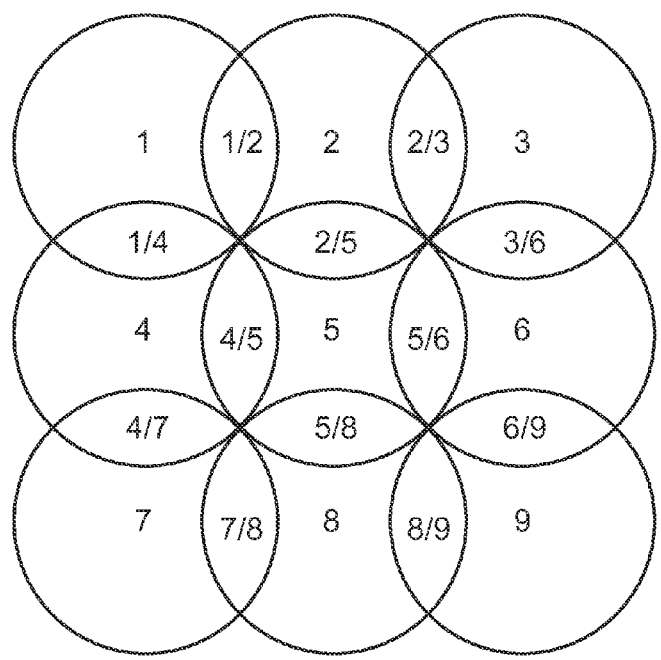
FIG. 2 shows an illustration for the reproduction of different audio streams according to a second embodiment.

FIG. 2 shows a representation of a position based decision scheme to reproduce different audio streams according to the second embodiment. In FIG. 2, nine different circles 1-9 are depicted. In each of the circles 1-9 represents an area where a specific audio stream is to be reproduced, i.e. in the circle 1, the audio stream 1 is to be reproduced and in the circle 2, the second audio stream is to be reproduced. In those areas where the first and second circle overlap, namely in the area 1/2, the audio stream 1 and the audio stream 2 will be mixed and be reproduced. In particular, a cross fading between the first and second audio stream 1, 2 may be performed.

According to the second embodiment, an audio stream to be reproduced by the portable or mobile device is selected based on the position of the mobile or portable device. In regions where two audio stream reproduction areas overlap, a third audio stream will be generated based on the two audio streams. The third audio stream may be generated by mixing the first and second audio streams, wherein a cross fading between the two audio streams may be performed.

Figure 3:
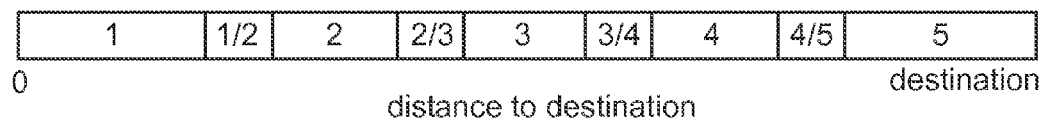
FIG. 3 shows a schematic representation of the reproduction of different audio streams according to a third embodiment.

FIG. 3 shows a basic representation of a decision scheme according to the third embodiment. Here, the decision which audio stream is to be reproduced is taken in dependence to the distance to a respective destination. At the furthest point from the destination, a first audio stream 1 is selected, transmitted and reproduced. Before a portable device reaches the second area 2, the portable device needs to cross a region where the first and second area overlap 1/2. In this region, a third audio stream will be generated based on the two audio streams. The third audio stream may be generated by mixing the first and second audio streams, wherein a cross fading between the two audio streams may be performed. The third audio stream is transmitted to the portable or mobile device where it can be reproduced. When the portable device reaches a distance to the destination which corresponds to the second area 2, a second audio stream will be reproduced. Before the portable device reaches a third area 3 or distance to a destination, the portable device will reach a region of an overlap between the second and third area 2/3, where the second and third audio stream is mixed and transmitted to the portable or mobile device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be constrained as limiting the scope of the claims.

The invention claimed is:

1. Method for reproducing at least one of audio content and video content on a device, comprising the steps of:
   determining a position of a user,
   selecting at least one of audio content and video content to be reproduced on the device based on the position of the user, and
   reproducing the selected at least one of audio content and video content by the device,
   wherein if the determined position of the user is in a first region, at least one of a first audio content and a first video content is selected, wherein if the determined position of the user is in a second area, at least one of a second audio content and a second video content is selected, wherein if the determined position of the user is in at least one of an overlap region of the first and second area and in a region between the first and second area, at least one of a third audio content and a third video content is generated based on at least one of the first audio content, the first video content, the second audio content, and the second video content and at least one of the third audio and the third video content is selected to be reproduced.

2. Method according to claim 1, further comprising the steps of:

transmitting at least one of the audio content and the video content to the device, and receiving the transmitted content.

3. Method according to claim 1, wherein the device is a portable device.

4. Method according to claim 3, wherein the device is associated to the user such that the position of the user corresponds to the position of the device.

5. Method according to claim 1, wherein the first region is within a first distance to a destination, and the second region is within a second distance to the destination, wherein if the determined position of the user is within an overlapping region between the first and second distance to the destination, at least one of the third audio content and the third video content is selected to be reproduced.

6. Method according to claim 2, wherein the selected at least one of the third audio content and the third video content is streamed to the device.

7. Method according to claim 4, further comprising the steps of:

determining the position of the user by the portable device;
forwarding the determined position to a selecting device;
selecting the content to be reproduced based on the determined position the selecting device; and
transmitting the selected content to the portable device.

8. System for reproducing audio/video content, comprising:

a selecting unit for selecting at least one of audio content and video content based on a position of a user;
wherein the selecting unit is adapted to select at least one of a first audio content and a first video content, if the determined position of the user is in a first region
wherein the selecting unit is adapted to select at least one of a second audio content and a second video content, if the determined position of the user is in a second area,
wherein if the determined position of the user is in an overlap region of the first and second areas or in a region between the first and second areas, the selecting unit is adapted to generate at least one of a third audio content and a third video content based on at least one of the first audio content, the first video content, the second audio content and the second video content and the selecting unit is adapted to select at least one of the third audio content and the third video content to be reproduced, and
a reproduction unit for reproducing the selected content.

9. Portable device, comprising:

a selecting unit for selecting at least one of audio content and video content based on a position of a user;
wherein the selecting unit is adapted to select at least one of a first audio content and a first video content, if the determined position of the user is in a first region
wherein the selecting unit is adapted to select at least one of a second audio content and a second video content, if the determined position of the user is in a second area
wherein if the determined position of the user is in an overlap region of the first and second areas or in a region between the first and second areas, the selecting unit is adapted to generate at least one of a third audio content and a third video content based on at least one of the first audio content, the first video content, the second audio content, and the second video content and the selecting unit is adapted to select at least one of the third audio content and the video content to be reproduced, and
a reproduction unit for reproducing the selected content.

* * * * *